(12) United States Patent
Nakamura et al.

(10) Patent No.: US 10,343,594 B2
(45) Date of Patent: Jul. 9, 2019

(54) REAR STRUCTURE OF VEHICLE

(71) Applicant: MAZDA MOTOR CORPORATION, Hiroshima (JP)

(72) Inventors: Yusuke Nakamura, Hiroshima (JP); Norihito Iwao, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 45 days.

(21) Appl. No.: 15/760,232

(22) PCT Filed: Oct. 4, 2016

(86) PCT No.: PCT/JP2016/079391
§ 371 (c)(1),
(2) Date: Mar. 15, 2018

(87) PCT Pub. No.: WO2017/073253
PCT Pub. Date: May 4, 2017

(65) Prior Publication Data
US 2018/0257543 A1    Sep. 13, 2018

(30) Foreign Application Priority Data
Oct. 26, 2015  (JP) .................................. 2015-209762

(51) Int. Cl.
*B60Q 1/00*  (2006.01)
*B60Q 1/30*  (2006.01)
(Continued)

(52) U.S. Cl.
CPC .............. *B60Q 1/30* (2013.01); *B60Q 1/0011* (2013.01); *B62D 35/007* (2013.01); *B62D 37/02* (2013.01);
(Continued)

(58) Field of Classification Search
CPC ...... B60Q 1/30; B60Q 1/0035; B60Q 1/0011; B60Q 1/26; B60Q 1/2619; B60Q 1/2696;
(Continued)

(56) References Cited

U.S. PATENT DOCUMENTS 5,165,751 A * 11/1992 Matsumoto .......... B62D 35/007
296/180.5
2006/0133103 A1* 6/2006 Muhlbaier ........... B60Q 1/2607
362/545
(Continued)

FOREIGN PATENT DOCUMENTS

| JP | S60-191550 U | 12/1985 |
| JP | S63-182978 U | 11/1988 |
| JP | 2015-168408 A | 9/2015 |

OTHER PUBLICATIONS

International Search Report issued in PCT/JP2016/079391; dated Dec. 27, 2016.

*Primary Examiner* — Peggy A Neils
(74) *Attorney, Agent, or Firm* — Studebaker & Brackett PC (57) ABSTRACT

A rear structure of a vehicle includes a lamp and a dividing member. The lamp includes at least one lamp part, and is disposed on a rear portion of the vehicle. The dividing member is a member for dividing the lamp at least in a vehicle up-down direction. The dividing member is formed in such a manner that blinking of a single lamp part of the lamp is directly viewable both from above and below the dividing member when viewed from the rear side of the vehicle.

7 Claims, 11 Drawing Sheets

(51) Int. Cl.
    *B62D 35/00*     (2006.01)
    *B62D 37/02*     (2006.01)
    *F21S 43/14*     (2018.01)
    *F21S 43/239*     (2018.01)
    *F21S 43/242*     (2018.01)
    *F21W 103/20*     (2018.01)
    *F21W 103/35*     (2018.01)
    *F21W 103/45*     (2018.01)
    *F21Y 115/10*     (2016.01)

(52) U.S. Cl.
    CPC ............ *F21S 43/239* (2018.01); *F21S 43/242* (2018.01); *F21S 43/14* (2018.01); *F21W 2103/20* (2018.01); *F21W 2103/35* (2018.01); *F21W 2103/45* (2018.01); *F21Y 2115/10* (2016.08); *Y02T 10/82* (2013.01)

(58) Field of Classification Search
    CPC ........ B60Q 1/44; B62D 37/02; B62D 35/007; F21S 43/14; F21S 43/235; F21S 43/239; F21S 43/242; F21S 43/26; F21S 43/40; F21S 42/239; F21W 2103/40; F21W 2103/45; F21W 2103/35; F21W 2103/20; F21Y 2115/10; Y02T 10/82
    See application file for complete search history.

(56) References Cited

U.S. PATENT DOCUMENTS

2015/0016131 A1     1/2015   Moessner
2016/0332510 A1    11/2016   Kinnou et al.

\* cited by examiner

REAR STRUCTURE OF VEHICLE

TECHNICAL FIELD

The present disclosure relates to a rear structure of a vehicle provided with a lamp including at least one lamp set.

BACKGROUND ART

There is a case that a rear spoiler is provided on a vehicle rear portion in order to improve aerodynamic characteristics by changing a direction of traveling wind flowing on an upper surface of a vehicle body. The rear spoiler projects outwardly from a vehicle body surface of the vehicle rear portion. Basically, a rear spoiler is disposed in such a manner that visibility from outside a vehicle (e.g. from a passenger in a succeeding vehicle, or a passer-by) with respect to a lamp such as a tail light is not obstructed. However, as exemplified in Patent Literatures 1 and 2, a rear spoiler may be disposed in proximity to a tail light or may be disposed in such a manner as cover a tail light.

Patent Literature 1 discloses a vehicle rear portion configured such that a rear light unit (4) as a lamp constituted by a tail light, a brake light, and the like is disposed on an outer end of the vehicle rear portion in the vehicle width direction, and a rear spoiler (6) extends in the vehicle width direction in a state that the rear spoiler (6) is supported on a rear spoiler support portion (5). Further, Patent Literature 1 discloses a configuration, in which an outer end of the rear spoiler (6) in the vehicle width direction overlaps the rear light unit (4) when viewed obliquely from above and from the rear side.

Further, Patent Literature 2 discloses a vehicle rear portion provided with a rear spoiler, wherein wings 2b and 2b are formed on both sides of the rear spoiler in the vehicle width direction in such a manner as to face a position corresponding to a tail lamp 3.

However, in a case where a rear spoiler is provided on an outer end of the rear light unit (4) as exemplified by the vehicle rear portion disclosed in Patent Literature 1, light from e.g. the tail light in the rear light unit (4) may be blocked by the rear spoiler.

Further, in a case where an upper portion of the tail lamp (3) is covered by a part of the rear spoiler as exemplified by the vehicle rear portion disclosed in Patent Literature 2, visibility of the tail lamp (3) when viewed obliquely from above and from the rear side may be seriously deteriorated.

CITATION LIST

Patent Literature

Patent Literature 1: Specification of U.S. Patent Application Publication No. 2015/0016131
Patent Literature 2: Japanese Unexamined Utility Model Publication No. S63-182978

SUMMARY OF INVENTION

In view of the above, an object of the present disclosure is to provide a rear structure of a vehicle, which enables to secure visibility of a lamp, secure design freedom around the lamp such as a tail lamp, and improve external appearance, without adding an element on the side of the lamp such as providing a plurality of lamp bodies.

A rear structure of a vehicle according to an aspect of the present disclosure includes a lamp and a dividing member. The lamp includes at least one lamp set, and is disposed on a rear portion of the vehicle.

The dividing member is a member for dividing the lamp at least in a vehicle up-down direction.

In the rear structure of the vehicle according to the aspect, the dividing member is formed in such a manner that blinking of a single lamp set of the lamp is directly viewable both from above and below the dividing member when viewed from a rear side of the vehicle.

DESCRIPTION OF EMBODIMENTS

In the following, an embodiment of the present disclosure is described with reference to the drawings. An embodiment to be described in the following is an aspect of the present disclosure. The present disclosure is not limited by the following embodiment except for an essential configuration of the present disclosure.

[Embodiment]

A rear structure of a vehicle 1 according to an embodiment is described using FIG. 1 to FIG. 8.

In FIG. 1 to FIG. 10, a vehicle front side is indicated by the arrow FR, a vehicle rear side is indicated by the arrow RE, a left side in the vehicle width direction is indicated by the arrow LE, and a right side in the vehicle width direction is indicated by the arrow RI.

1. Schematic Structure of Vehicle Rear Portion 1R of Vehicle 1

As illustrated in FIG. 1 to FIG. 6, rear lamp units 2 and 2 are mounted on the left side and the right side of a vehicle rear portion 1R, respectively. Further, a rear spoiler 3 extending in the vehicle width direction is formed on the vehicle rear portion 1R provided with the paired left and right rear lamp units 2 and 2.

Figure 1:
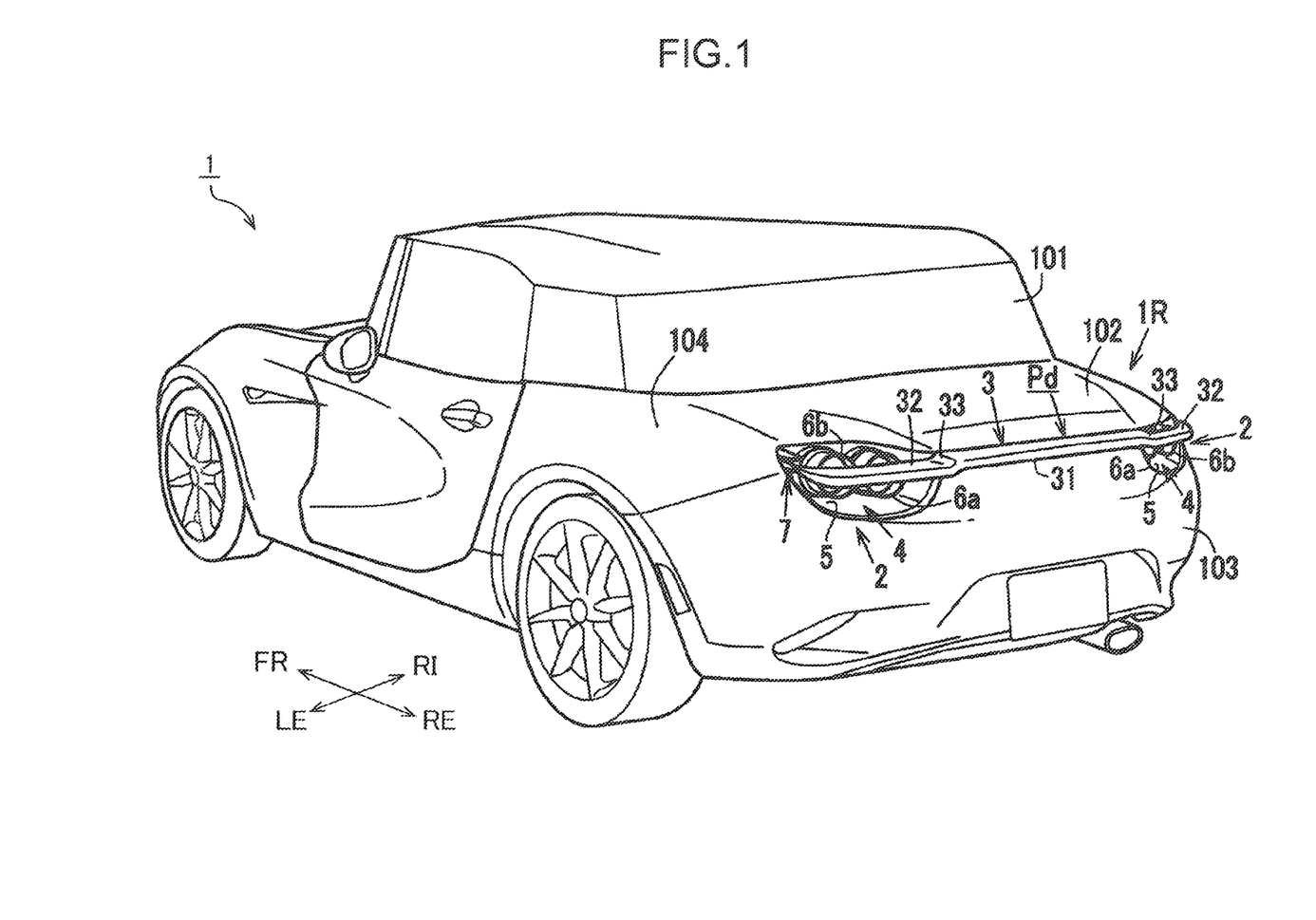
FIG. 1 is a schematic perspective view of a vehicle 1 according to an embodiment when viewed from the rear side.

As illustrated in FIG. 1, the vehicle 1 includes a rear window glass 101, a rear deck panel 102, a bumper face 103, and a rear fender panel 104.

As illustrated in FIG. 1 to FIG. 8, a recess portion 4 formed by projecting a part of a vehicle body toward the vehicle front side is formed at a position where each of the rear lamp units 2 of the vehicle rear portion 1R is installed (on left and right portions of the vehicle rear portion 1R). As illustrated in FIG. 1 to FIG. 4, the recess portion 4 is formed to have an oblong shape extending from an outer end thereof in the vehicle width direction toward the inside in the vehicle width direction, with a length longer than the length thereof in the vehicle up-down direction when viewed from the rear side.

Figure 3:
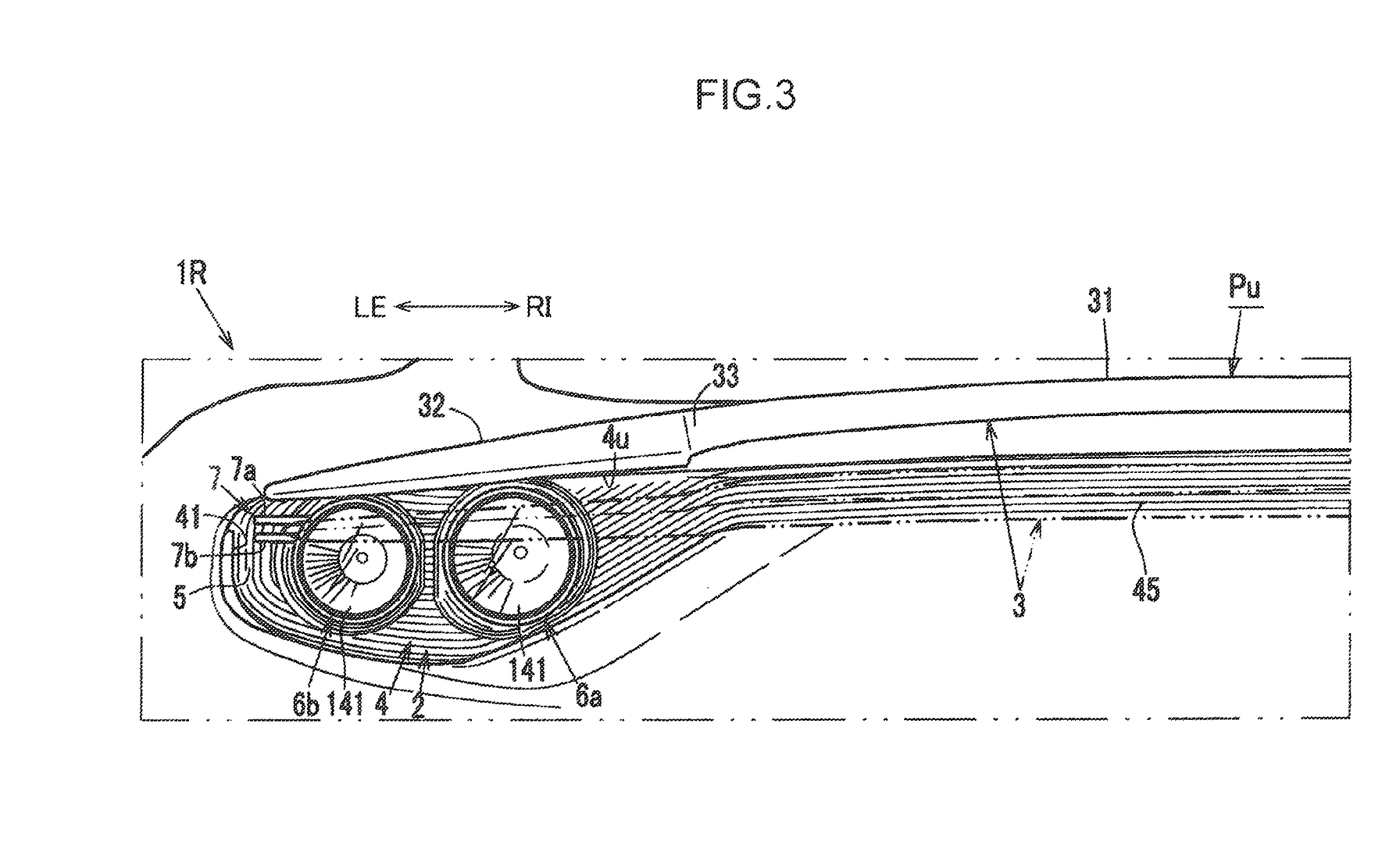
FIG. 3 is a schematic rear view illustrating a partial configuration of the vehicle rear portion 1R when the rear spoiler 3 is in an up posture.

The vehicle rear portion 1R has a recessed shape such that the vehicle rear portion 1R continuously connects between the left rear lamp unit 2 and the right rear lamp unit 2, specifically, between upper portions of inner ends of the left recess portion 4 and the right recess portion 4 in the vehicle width direction via a recessed shape portion 45, whose length is shorter than the length of the recess portion 4 in the up-down direction (see FIG. 3).

As illustrated in FIG. 2, and FIG. 3 to FIG. 8, a body corresponding to an installation portion of each of the rear lamp units 2 on left and right ends of the vehicle rear portion 1R includes an extension edge portion 41, which is formed such that an edge of an opening of the recess portion 4 extends forwardly so as to form the opening.

Figure 6:
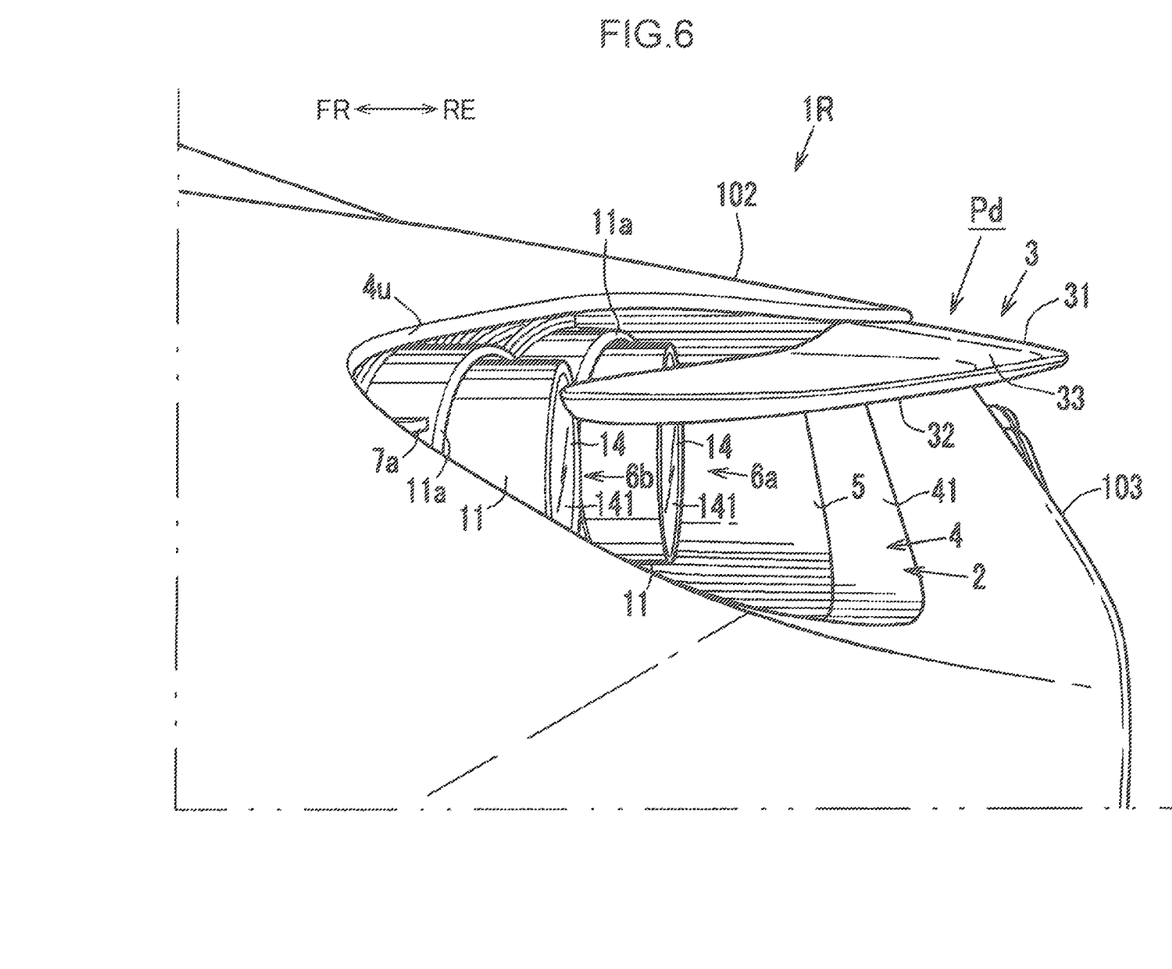
FIG. 6 is a schematic left side view illustrating a partial configuration of the vehicle rear portion 1R when viewed from the left side in a state that the rear spoiler 3 is in a down posture.
Figure 7:
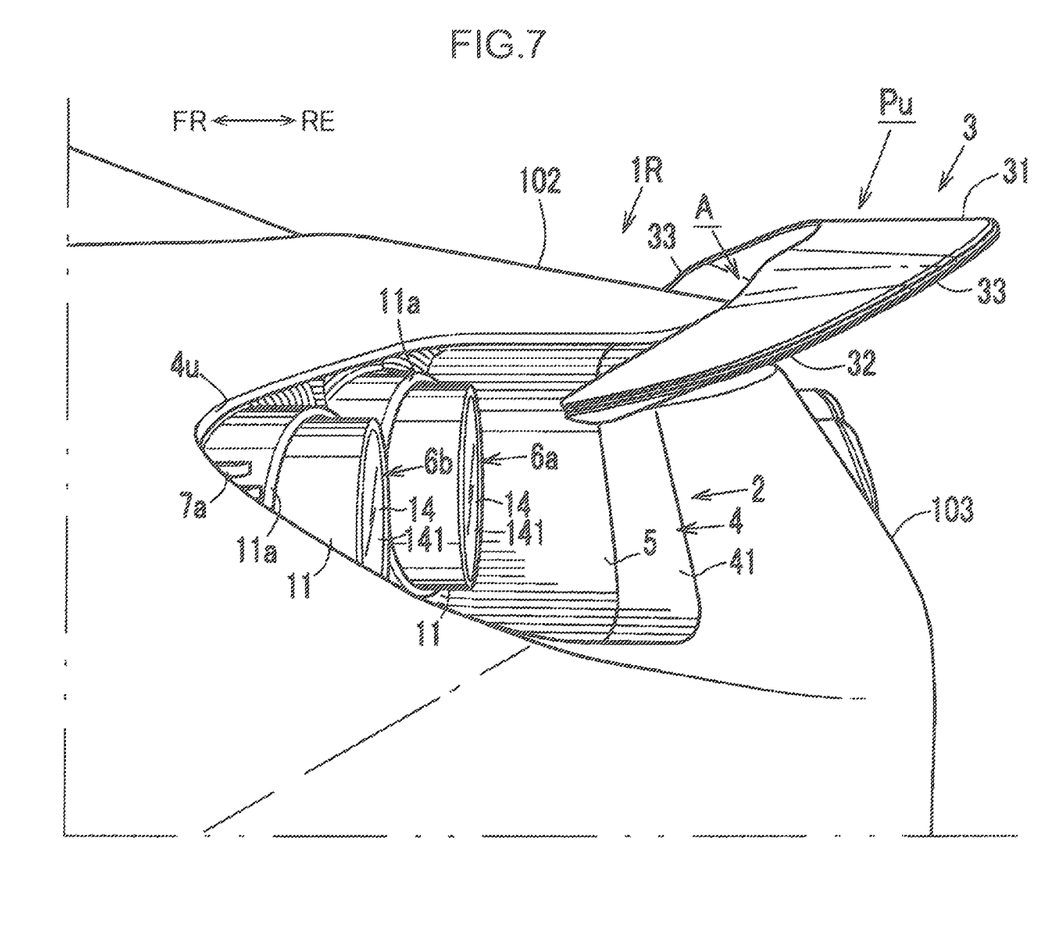
FIG. 7 is a schematic left side view illustrating a partial configuration of the vehicle rear portion 1R when viewed from the left side in a state that the rear spoiler 3 is in an up posture.
Figure 8:
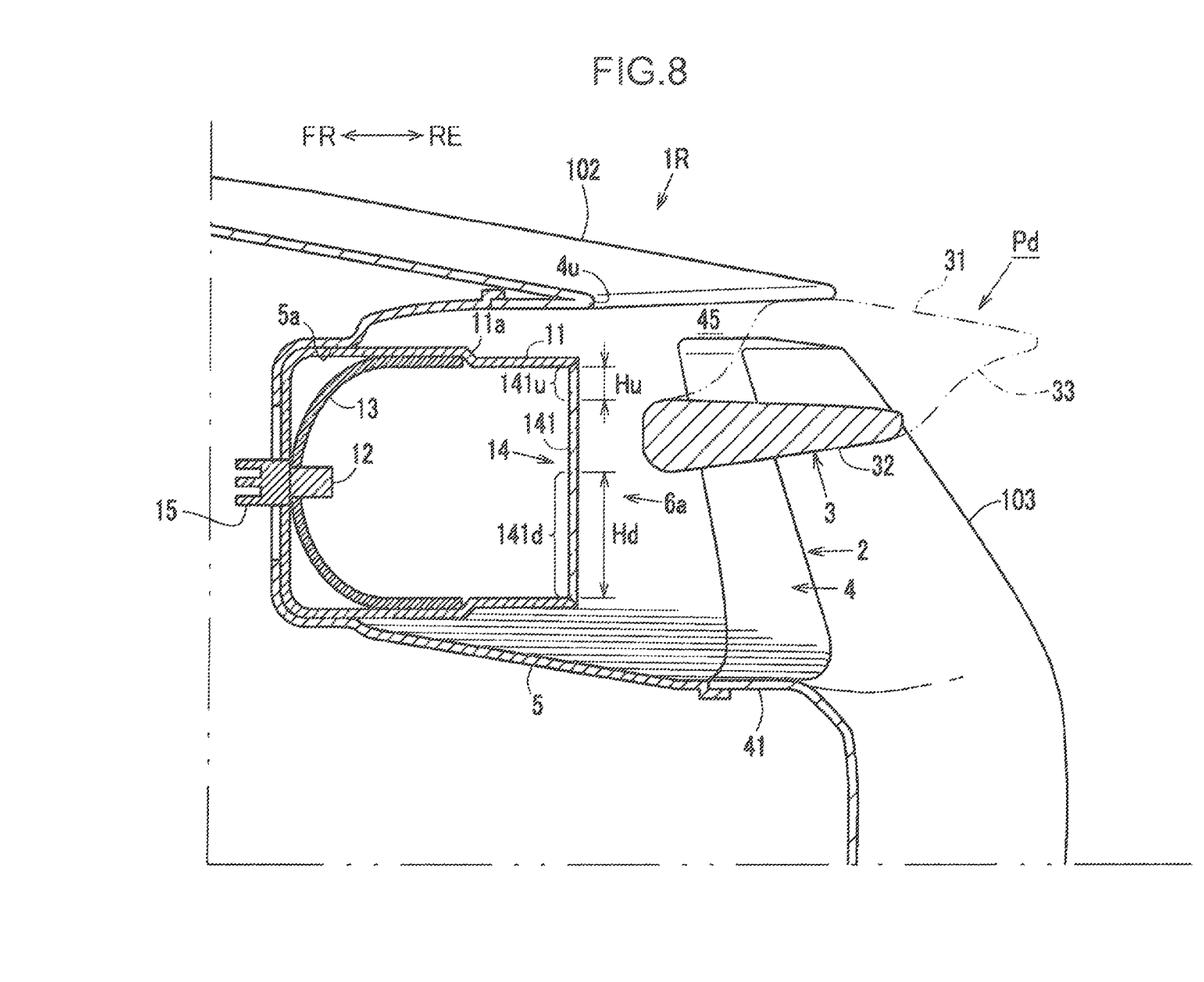
FIG. 8 is a schematic sectional view schematically illustrating an inner structure of a rear lamp unit 2.

As illustrated in FIG. 1 to FIG. 8, a substantially entirety of a peripheral surface of the recess portion 4 is formed by a bezel 5 made of resin and provided in the rear lamp unit 2. The bezel 5 is formed to have a closed bottom including an opening in a rear end thereof. As illustrated in FIG. 8, a front edge of the bezel 5 is abutted against the extension edge portion 41 of a vehicle body, which is included in the edge of the opening of the recess portion 4. Specifically, the bezel 5 and the extension edge portion 41 constitute a smooth peripheral surface of the recess portion 4 having a closed bottom and projecting toward the vehicle front side.

The recess portion 4 in the embodiment communicates between an inner space of the recess portion 4 and a space outside of the vehicle in a state that the opening of the recess portion 4 is not covered by a lens, a transparent cover, or the like.

As illustrated in FIG. 1 to FIG. 7, the rear lamp unit 2 includes two rear lamp bodies 6 (an inner rear lamp set 6a and an outer rear lamp set 6b), and a turn signal portion 7 as lamps disposed side by side from the inner side to the outer side of the recess portion 4 in the vehicle width direction so that the two rear lamp bodies 6 and the turn signal portion 7 are accommodated in the recess portion 4.

In the embodiment, the rear lamp set 6 on the inner side in the vehicle width direction (inner rear lamp set 6a) is a backlight (back signal lamp), which is lit on when the vehicle travels backward. The rear lamp set 6 on the outer side in the vehicle width direction (outer rear lamp set 6b) is a tail and stop lamp (tail lamp/stop signal lamp), which is lit on when a driver operates a switch (not illustrated) within a vehicle compartment, and which strongly emits light when the driver steps on a brake pedal (not illustrated). The inner rear lamp set 6a and the outer rear lamp set 6b are disposed in parallel to each other in a plan view in such a manner that lens surfaces 141 to be described later face the rear side of the vehicle.

Figure 2:
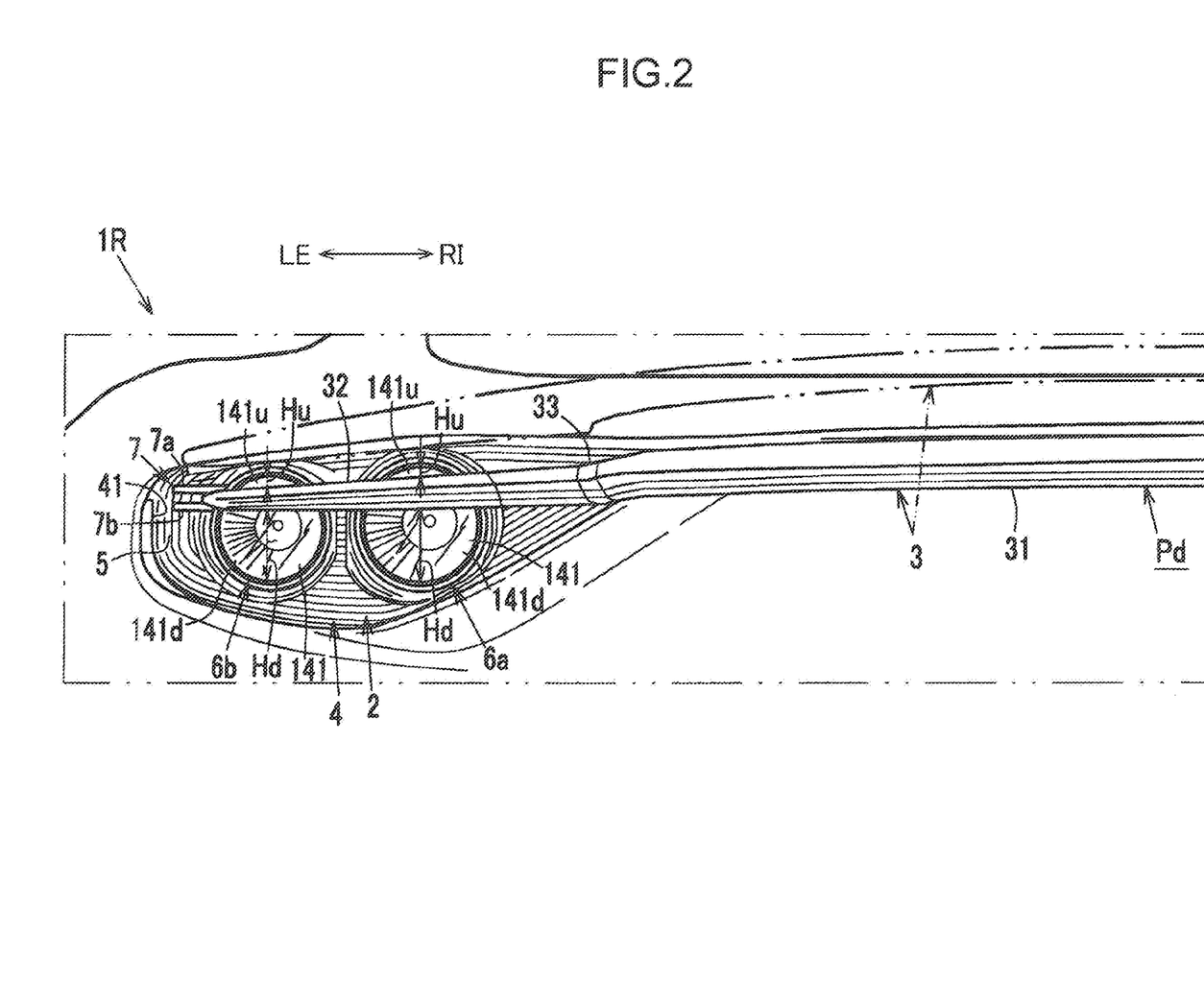
FIG. 2 is a schematic rear view illustrating a partial configuration of a vehicle rear portion 1R when a rear spoiler 3 is in a down posture.
Figure 4:
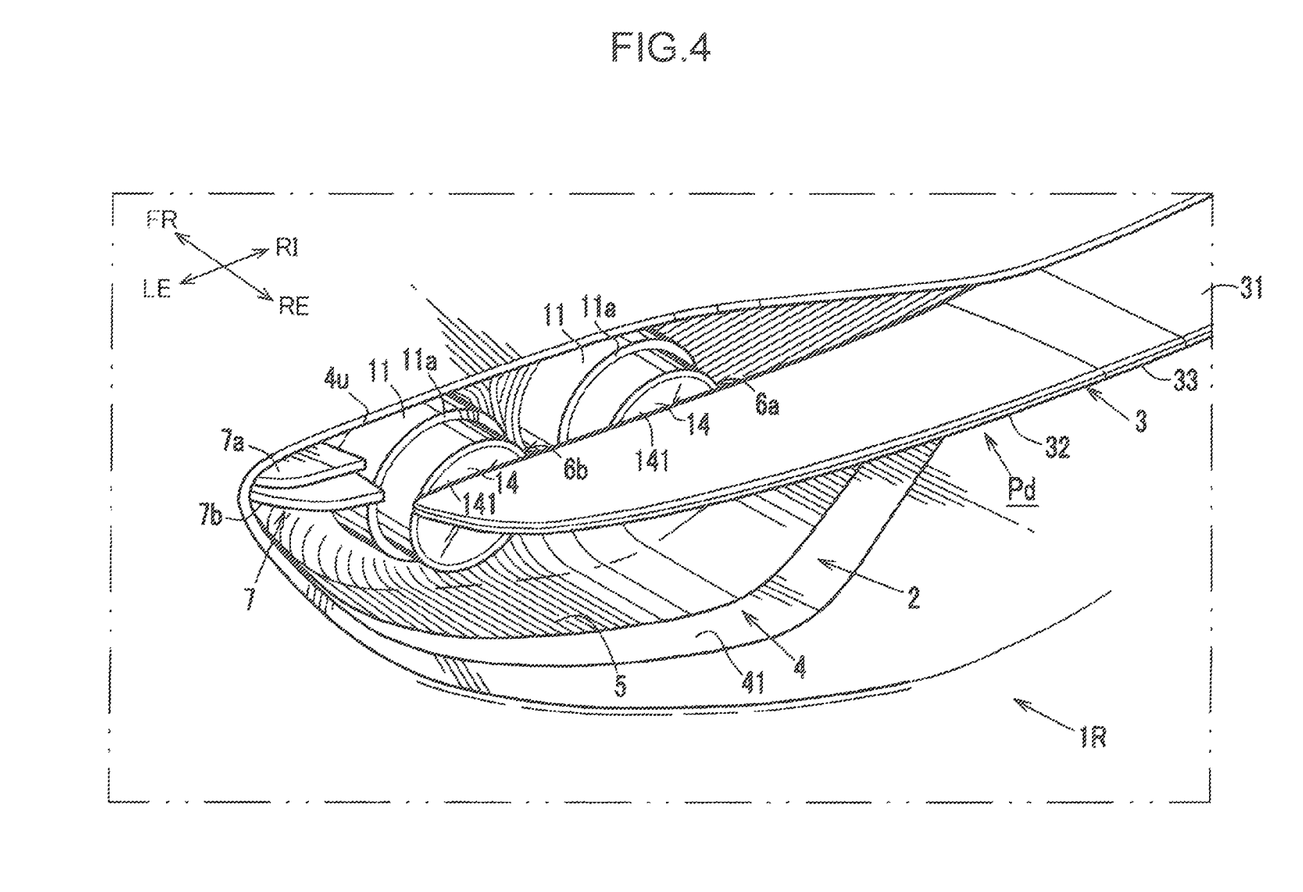
FIG. 4 is a schematic perspective view of a left end of the vehicle rear portion 1R when viewed from above in a state that the rear spoiler 3 is in a down posture.
Figure 5:
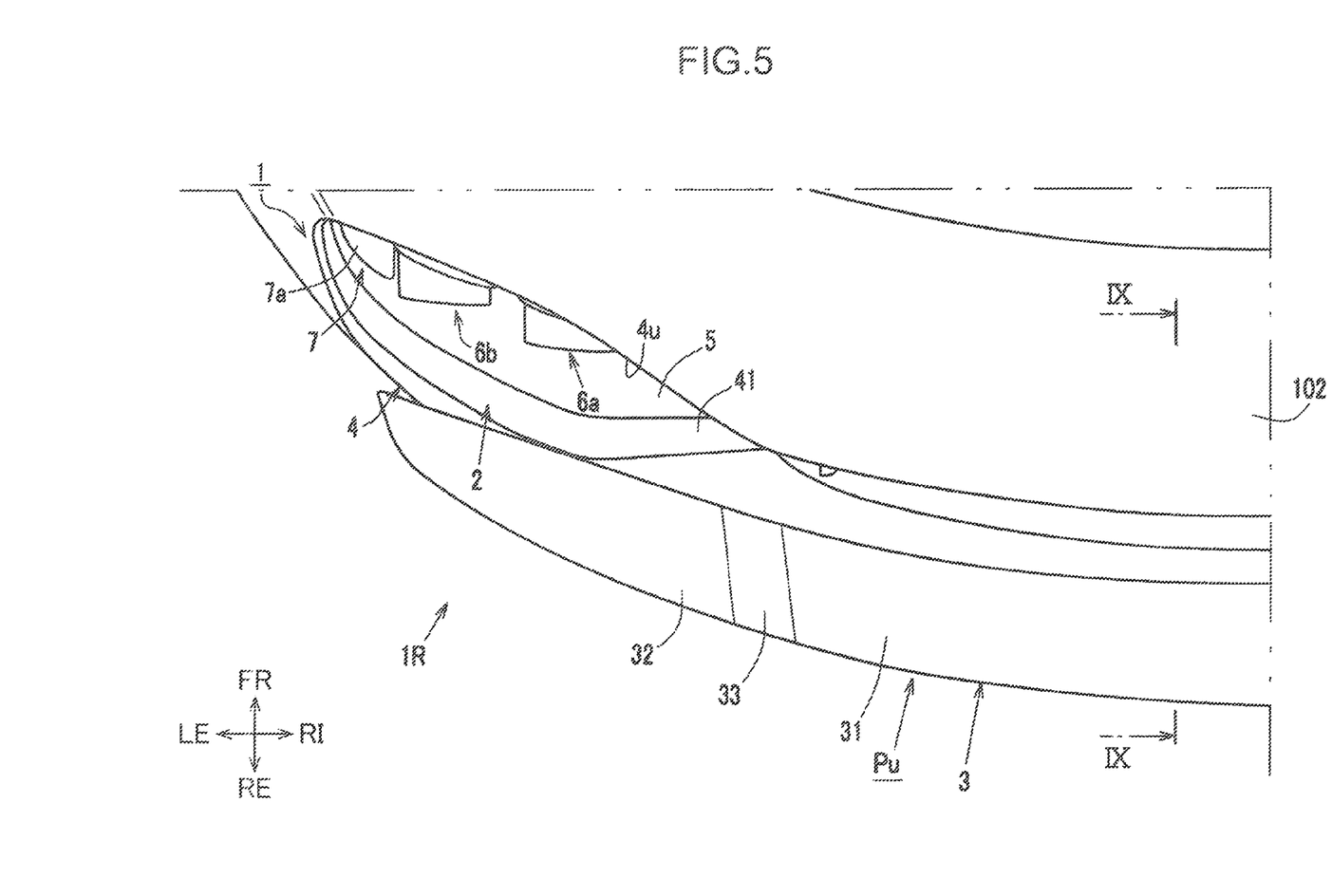
FIG. 5 is a schematic plan view illustrating a partial configuration of the vehicle rear portion 1R when viewed from above in a state that the rear spoiler 3 is in an up posture.

Fin-shaped light guiding plates 7a and 7b illustrated in FIG. 2, FIG. 3, and FIG. 4 are formed as a part of the turn signal portion 7. Specifically, the fin-shaped light guiding plates 7a and 7b guide light from a turn signal light source (not illustrated) within the rear lamp unit 2 for blinking when a driver operates a turn signal lever (not illustrated). The fin-shaped light guiding plate 7a, 7b is a light transmissive member made of acrylic resin or the like.

2. Structure of Rear Lamp Set 6

Next, an inner structure of the rear lamp set 6 is described. In the vehicle 1 according to the embodiment, the left rear lamp unit 2 and the right rear lamp unit 2 are formed to be symmetrical in the vehicle left-right direction, and the inner rear lamp set 6a and the outer rear lamp set 6b have substantially the same inner structures. Therefore, the inner structure of the rear lamp set 6 is described based on FIG. 8, which schematically illustrates a longitudinal section of the inner rear lamp set 6a of the right rear lamp unit 2.

As illustrated in FIG. 8, the rear lamp set 6 includes a lamp case 11, an LED light source 12, a reflector 13, a lens 14, and a heat sink 15.

The lamp case 11 is formed to have a stepped cylindrical shape provided with a step portion 11a for accommodating the reflector 13 and the LED light source 12 in such a manner that a rear portion of the lamp case 11 has a smaller diameter than a front portion thereof. In the embodiment, the lamp case 11 is mounted in a recess portion 5a (see FIG. 8), which is formed in a bottom surface of the bezel 5 in such a manner that a center axis of the lamp case 11 is aligned with the vehicle front-rear direction.

The LED light source 12 is formed, as a light source, at a front end of the rear lamp set 6 and at a substantially middle portion thereof when viewed from the rear side. Further, the LED light source 12 is connected to a controller (not illustrated) disposed on the outside of the rear lamp set 6 (inner rear lamp set 6a) via a wiring harness or the like (not illustrated).

The reflector 13 is formed into a bowl shape. The LED light source 12 projects from a bottom portion of the reflector 13. The reflector 13 is formed into a substantially U-shape in section in such a manner that the reflector 13 surrounds a peripheral edge of the LED light source 12 so that light emitted from the LED light source 12 is reflected in a direction toward the vehicle rear side.

The lens 14 is formed to have a flat shape in section and is made of light transmitting resin. The lens 14 is mounted in such a manner as to close an opening of a rear end of the lamp case 11.

The heat sink 15 is disposed on the outside of the rear lamp set 6 and on the front side of the LED light source 12 for the LED light source 12. The heat sink 15 has a function as a radiator for radiating heat emitted from the LED light source 12.

3. Structure of Rear Spoiler 3

As illustrated in FIG. 1, the rear spoiler 3 is a plate-shaped member made of resin and extending substantially over the entire length of the vehicle rear portion 1R in the vehicle width direction. As illustrated in FIG. 1 to FIG. 7, the rear spoiler 3 is integrally formed of a middle portion 31 formed at a middle thereof in the vehicle width direction, outer portions 32 and 32 formed on outer sides than the middle portion 31 in the vehicle width direction at a position lower than the middle portion 31, and a connection portion 33 for connecting the middle portion 31 and each of the outer portions 32 and 32. The rear spoiler 3 is formed to be symmetrical in the vehicle left-right direction.

All of the middle portion 31, the connection portions 33, and the outer portions 32 of the rear spoiler 3 extend in the front-rear direction with a size larger than a thickness of the rear spoiler 3 in the up-down direction. Therefore, the rear spoiler 3 is formed to have a plate shape long in the vehicle width direction as a whole. As illustrated in FIG. 2, FIG. 4, and FIG. 6, the rear spoiler 3 is configured in such a manner that the posture of the rear spoiler 3 is changeable between a down posture Pd where the rear spoiler 3 is lowered to a position at which the rear lamp set 6 is divided into two parts in the vehicle up-down direction, and an up posture Pu where the rear spoiler 3 is raised to a position higher than a position corresponding to the down posture Pd.

As illustrated in FIG. 1, FIG. 2, FIG. 4, and FIG. 6, the outer portion 32 of the rear spoiler 3 extends in the vehicle width direction in such a manner that the outer portion 32 transverses the rear lamp unit 2 to an outer end of the rear lamp unit 2 in the vehicle width direction in a state that the rear spoiler 3 is in a down posture Pd.

Specifically, the outer portion 32 of the rear spoiler 3 extends to divide (transverse) the lens surface 14 formed on a rear end of the rear lamp set 6 (the inner rear lamp set 6a and the outer rear lamp set 6b) into an upper portion and a lower portion when viewed from the rear side (see FIG. 1, FIG. 2, FIG. 4, and FIG. 6). According to the aforementioned configuration, the outer portion 32 of the rear spoiler 3 is disposed at such a position that the lens surface 141 of the rear lamp set 6, specifically, blinking of the rear lamp set 6 is directly viewable both from above and below the outer portion 32 (see FIG. 2 and FIG. 4).

More specifically, the outer portion 32 of the rear spoiler 3 is disposed in such a manner that a lower portion 141d of the lens surface 141 on the lower side with respect to the outer portion 32 has a longer length in the up-down direction than an upper portion 141u of the lens surface 141 on the upper side with respect to the outer portion 32 (Hd>Hu) when viewed from the rear side (see FIG. 2 and FIG. 8).

Specifically, as illustrated in FIG. 8, the outer portion 32 is disposed in such a manner that the lens surface 141 formed on the rear lamp set 6 is divided into an upper portion and a lower portion on the upper side than an intermediate portion of the lens surface 141 in the up-down direction when viewed from the rear side of the vehicle 1.

Further, the outer portion 32 faces the lens surface 141 on the rear side in a state that the rear spoiler 3 enters into a position inner than the opening of the recess portion 4 in a plan view when the rear spoiler 3 is in a down posture Pd (see FIG. 6 and FIG. 8).

The outer portion 32 extends in the front-rear direction (i.e. has a certain length in the front-rear direction). However, the lower portion 141d of the lens surface 141a of the rear lamp set 6 on the lower side than the outer portion 32 is disposed in such a manner that the lower portion is directly viewable when viewed from the rear side of the vehicle 1 (see FIG. 2).

In a case where the lens surface 141 is disposed at a position different from a case where the lens surface 141 faces the rear side of the vehicle, as exemplified by the vehicle 1 in the embodiment, for example, in a case where the lens 14 is inclined in a state that a front portion thereof is inclined upwardly and a rear portion thereof is inclined downwardly (with an angle of elevation) so that the lens surface 14 faces obliquely upwardly and rearwardly, the lower portion 141d of the lens surface 141 may overlap the outer portion 32 in the front-rear direction in a plan view, and for example, the lower portion 141d may not be viewable when viewed obliquely from above the vehicle and from the rear side of the vehicle.

However, in the vehicle 1, the lower portion 141d of the lens surface 141 is formed to have a longer length in the up-down direction than the upper portion 141u of the lens surface 141 with respect to the outer portion 32. Therefore, the lower portion 141d, which is the remainder of the lens surface 141 other than the overlap portion, is directly viewable when viewed obliquely from above the vehicle and from the rear side of the vehicle, or from above the vehicle.

As illustrated in FIG. 1, FIG. 2, and FIG. 3, the middle portion 31 of the rear spoiler 3 is located at a position corresponding to a substantially middle of the paired left and right rear lamp units 2 and 2 of the rear spoiler 3 in the vehicle width direction. At least an upper surface of the middle portion 31 extends in the vehicle width direction at a position higher than the lens surface 141 of the rear lamp set 6 in a state that the rear spoiler 3 is in a down posture Pu as well as a state that the rear spoiler 3 is in an up posture Pu (see FIG. 2).

Further, as illustrated in FIG. 6, the middle portion 31 of the rear spoiler 3 is located at an upper end of the bumper face 103 which forms a rear surface of the vehicle rear portion 1R, and projects rearwardly from a rear end of the rear deck panel 102 in a state that the rear spoiler 3 is in a down posture Pd.

As illustrated in FIG. 2 and FIG. 6, each of upper surfaces of the middle portion 31 and the outer portions 32 of the rear spoiler 3 is formed to have a smooth curved surface which is gradually inclined downwardly toward the outer side in the vehicle width direction and toward the vehicle rear side.

Further, the connection portion 33 of the rear spoiler 3 is formed to have a smooth step shape, which is inclined downwardly toward the outer side in the vehicle width direction in such a manner that the middle portion 31, and the outer portion 32 disposed at a lower position than the middle portion 31 on the outer side in the vehicle width direction are connected (see FIG. 1, FIG. 2, and FIG. 6). Further, the connection portion 33 of the rear spoiler 3 is formed to be inclined in such a manner that the connection portion 33 is gradually located on the inner side in the vehicle width direction toward the rear side (see FIG. 4 to FIG. 6).

Figure 9:
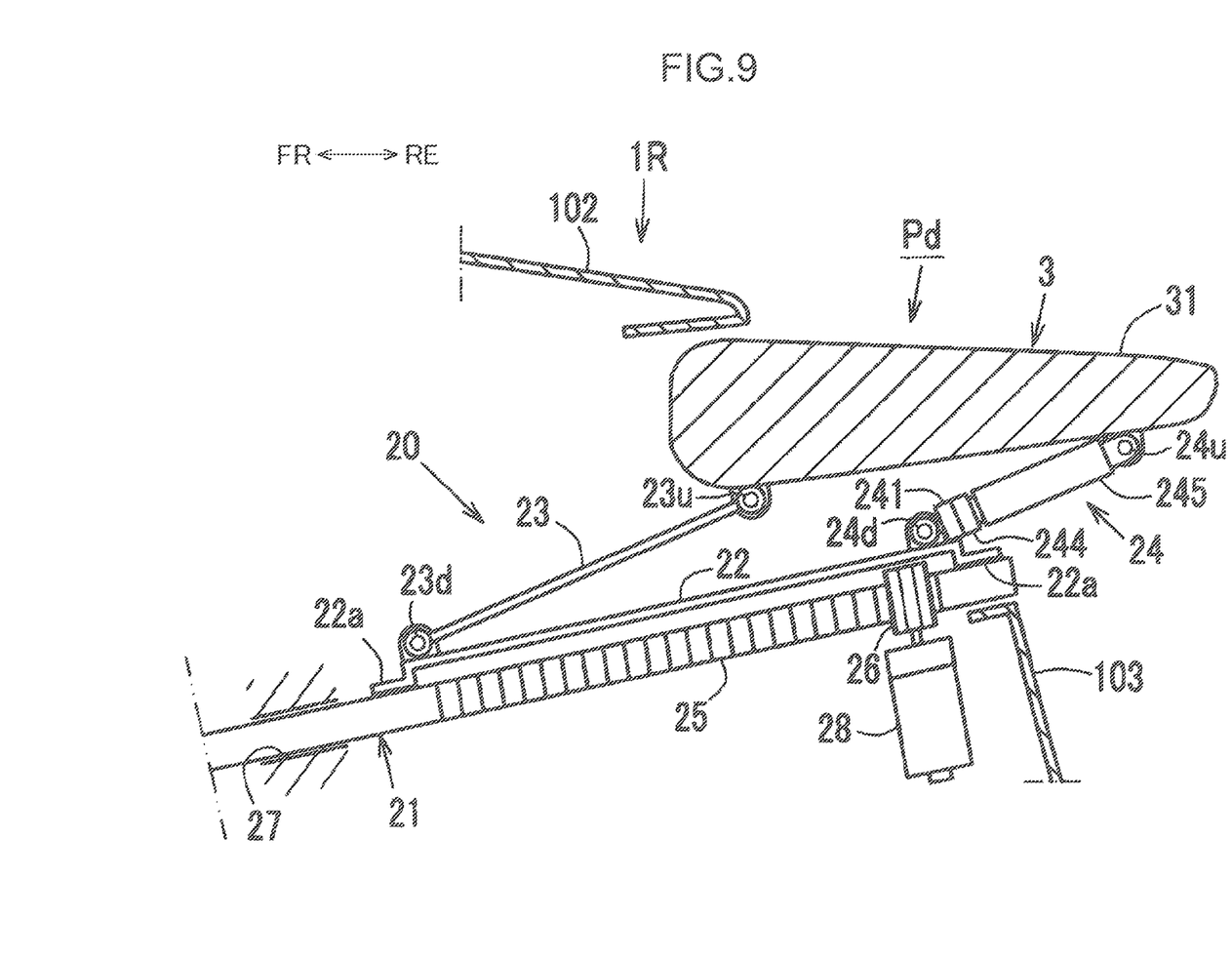
FIG. 9 is a sectional view taken along the line IX-IX in FIG. 5, and is a schematic sectional view illustrating a state of a drive support device 20 when the rear spoiler 3 is in a down posture.
Figure 10:
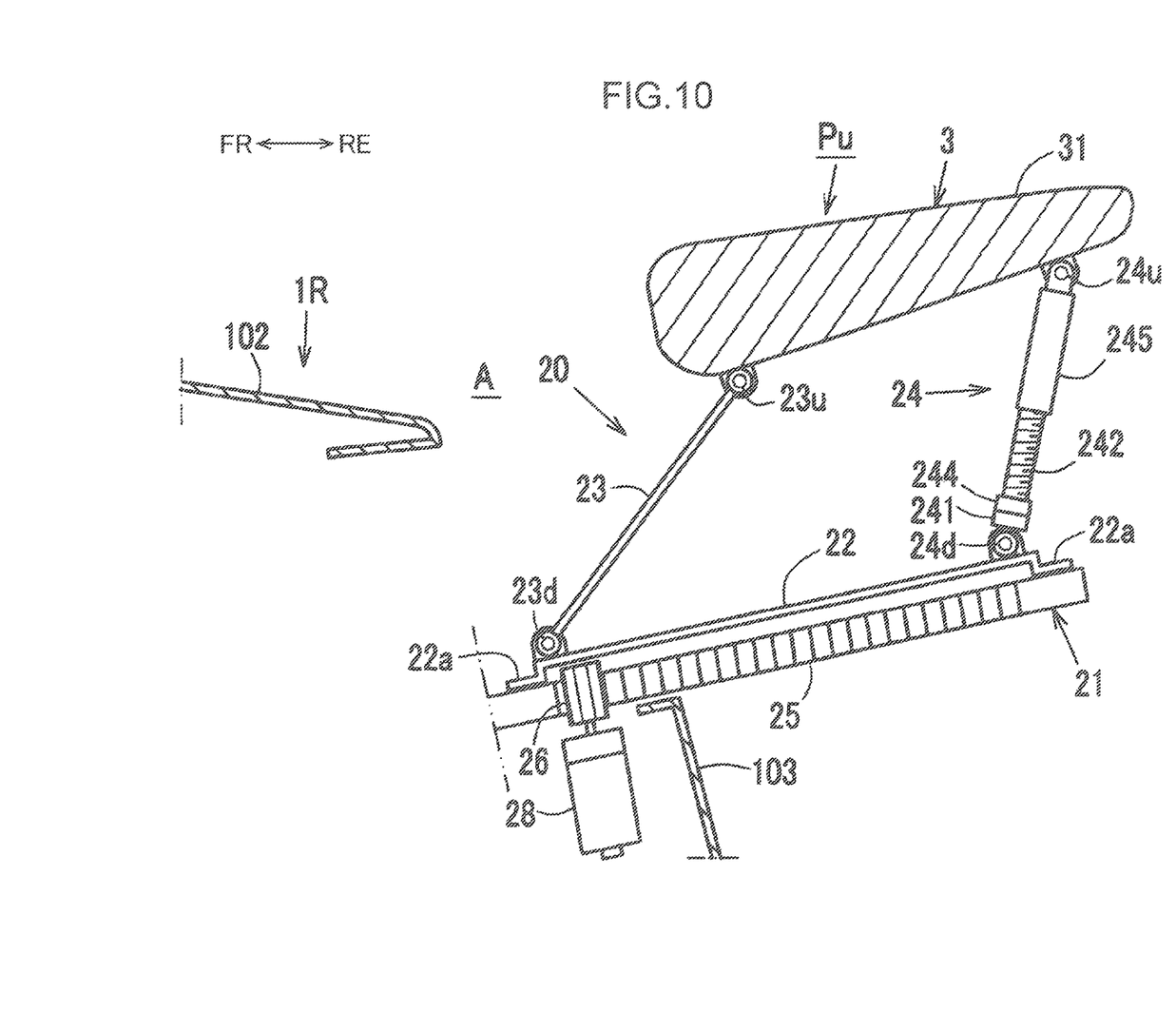
FIG. 10 is a schematic sectional view illustrating a state of the drive support device 20 when the rear spoiler 3 is in an up posture.

As illustrated in FIG. 9 and FIG. 10, the rear spoiler 3 is supported by a drive support device 20 in such a manner that the posture of the rear spoiler 3 is changeable between a down posture Pd and an up posture Pu.

4. Structure of Drive Support Device 20

A structure of the drive support device 20 is described using FIG. 9 and FIG. 10. FIG. 9 is a sectional view taken along the line IX-IX in FIG. 5, and is a schematic sectional view schematically illustrating a drive support device. FIG. 9 and FIG. 10 are respectively sectional views when a rear spoiler is in a down posture and when the rear spoiler is in an up posture. In FIG. 9 and FIG. 10, illustration of a structure of a vehicle body inner portion except for a drive support device is omitted.

As illustrated in FIG. 9 and FIG. 10, substantially the entirety of the drive support device 20 is incorporated in the middle portion 31 of the vehicle rear portion 1R in the vehicle width direction, and supports the middle portion 31 of the rear spoiler 3 from below in such a manner that the rear spoiler 3 is shifted between a down posture Pd and an up posture Pu.

As illustrated in FIG. 9 and FIG. 10, the drive support device 20 mainly includes a base 21, an arm mounting bracket 22, a support arm 23, and an extensible/contractible support arm 24.

Further, the support arm 23 and the extensible/contractible support arm 24 are provided as a pair for each on the left side and the right side of a middle portion of the vehicle rear portion 1R in the vehicle width direction. The rear spoiler 3 is supported by the four support arms 23 and 24 in total. However, in FIG. 9 and FIG. 10, only one of the support arms 23 and one of the extensible/contractible support arms 24 out of those on the left side and the right side of the vehicle rear portion 1R in the vehicle width direction are illustrated.

As illustrated in FIG. 9 and FIG. 10, a rack 25 is mounted on the base 21 along a sliding direction of the rack 25. Further, a pinion 26 engageable with the rack 25, and a base sliding motor 28 for driving and rotating the pinion 26 are mounted on the vehicle body. The base 21 is a plate-shaped member guided by a guide member 27 (see FIG. 9) provided on the vehicle body. The base 21 is slidable to project rearwardly or retract with respect to the vehicle rear portion 1R by the rack 25, the pinion 26, and the base sliding motor 28.

The arm mounting bracket 22 has a rigidity capable of supporting the support arm 23 and the extensible/contractible support arm 24. A flange 22a formed on an outer end of the arm mounting bracket 22 is integrally fastened to an upper surface of the base 21.

The extensible/contractible support arm 24 includes an arm extending/contracting motor 241 as drive means, a screw shaft 242 (see FIG. 10), a boss portion 244 (coupling) interposed between the arm extending/contracting motor 241 and the screw shaft 242 for transmitting a driving force of the arm extending/contracting motor 241 to the screw shaft 242, and a nut member 245 screwable as the screw shaft 242 is rotated.

The support arm 23 is a driven link pivotable in association with pivotal movement of the extensible/contractible support arm 24 as a main driving link.

Upper ends of the support arm 23 and the extensible/contractible support arm 24 are respectively connected to a front portion and a rear portion of a lower surface of the rear spoiler 3 via pivot portions 23u and 24u. Specifically, the extensible/contractible support arm 24 is configured such that an upper end of the nut member 245 is connected to a lower surface of the rear spoiler 3.

On the other hand, lower ends of the support arm 23 and the extensible/contractible support arm 24 are respectively connected to a front portion and a rear portion of a mounting bracket via pivot portions 23d and 24d. As described above, the support arm 23 and the extensible/contractible support arm 24 are connected to the base 21 via the arm mounting bracket 22.

By the drive support device 20, when the rear spoiler 3 is shifted from a down posture Pd illustrated in FIG. 9 to an up posture Pu illustrated in FIG. 10, first of all, the pinion 26 is rotated by driving the base sliding motor 28. Then, the base 21 is rectilinearly moved outwardly and rearwardly from the vehicle rear portion 1R by the pinion 26 and the rack 25. Thereby, the rear spoiler 3 is moved away toward the vehicle rear side.

Thereafter, when the screw shaft 242 is rotated by driving the arm extending/contracting motor 241, the nut member 245 is rectilinearly moved. Then, the extensible/contractible support arm 24 is extended. Thereby the support arm 23 and the extensible/contractible arm 24 are cooperatively and pivotally moved counterclockwise when viewed from the left side in such a manner that the support arm 23 and the extensible/contractible arm 24 are raised with respect to the base 21. Then, the rear spoiler 3 is lifted up from below by the support arm 23 and the extensible/contractible arm 24, and is shifted to the up posture Pu while moving toward the vehicle upper side (see FIG. 10).

The outer portion 32 of the rear spoiler 3 is displaced at a position away from the recess portion 4 rearwardly and upwardly by shifting the rear spoiler 3 from a down posture Pd to an up posture Pu.

Specifically, the outer portion 32, which is disposed at such a height position that the rear lamp set 6 is divided into an upper portion and a lower portion when the rear spoiler 3 is in a down posture Pd, as illustrated in FIG. 2 and FIG. 6, is disposed at a position away from an upper edge portion 4u of the recess portion 4 upwardly and rearwardly when the rear spoiler 3 is in an up posture Pu, as illustrated in FIG. 3 and FIG. 7.

In other words, the outer portion 32 of the rear spoiler 3 is disposed on the upper side than the rear lamp set 6 in a state that the rear spoiler 3 is in an up posture Pu. Specifically, in the embodiment, the outer portion 32 is disposed on the upper side than an upper end of the lens surface 141 of the rear lamp set 6 when the rear spoiler 3 is in an up posture Pu (see FIG. 3).

On the other hand, the middle portion 31 of the rear spoiler 3 extends rearwardly from a rear end of the rear deck panel 102 and from an upper end of the rear end panel 103 in a side view in a state that the rear spoiler 3 is in a down posture Pd (see FIG. 6). When the rear spoiler 3 is in an up posture Pu, the middle portion 31 is disposed at a position away from the rear deck panel 102 upwardly and at a position away from the rear end panel 103 rearwardly (see FIG. 7 and FIG. 10). Specifically, the middle portion 31 of the rear spoiler 3 forms a space A for communicating a lower surface of the middle portion 31 and the rear deck panel 102 in the front-rear direction in a state that the rear spoiler 3 is in an up posture Pu (see FIG. 6 and FIG. 10). The middle portion 31 and the outer portions 32 of the rear spoiler 3 are in an inclined posture such that front portions of the middle portion 31 and the outer portions 32 are inclined downwardly and rear portions thereof are inclined upwardly in a state that the rear spoiler 3 is in an up posture Pu (see FIG. 7).

When the rear spoiler 3 is shifted from an up posture Pu to a down posture Pd, the drive support device 20 performs the aforementioned steps in an order opposite to the order when the rear spoiler 3 is shifted from the down posture Pd to the up posture Pu. Specifically, first of all, the extensible/contractible support arm 24 is contracted, and is moved to the lower side. Thereafter, the base 21 is retracted into the vehicle rear portion 1R.

Further, the rear spoiler 3 in the embodiment is configured in such a manner that the posture of the rear spoiler 3 is changed to an up posture Pu by automatically driving the drive support device 20 during traveling of the vehicle, while keeping a down posture Pd when the vehicle stops. As means for detecting whether a vehicle is travelling or is stopped, for example, detection may be performed based on whether an acceleration pedal is stepped on. However, a specific configuration of the detection means is not particularly limited.

5. Advantageous Effects

A rear structure of the vehicle 1 in the embodiment is such that the rear lamp unit 2 as a lamp provided with the rear lamp set 6 being at least one lamp set is disposed on the vehicle rear portion 1R, the rear spoiler 3 as a dividing member for dividing the rear lamp unit 2 at least in the vehicle up-down direction is provided, and the rear spoiler 3 is configured in such a manner that blinkings of the inner rear lamp set 6a and the outer rear lamp set 6b of the rear lamp unit 2 are respectively and directly viewable both from the upper portion 141u located on the upper side of the rear spoiler 3 and from the lower portion 141d located on the lower side of the rear spoiler 3 (see FIG. 1, FIG. 2, FIG. 4, and FIG. 8).

According to the aforementioned configuration, the outer portion 32 of the rear spoiler 3 is disposed in such a manner that the rear lamp unit 2 is divided into two parts in the vehicle up-down direction. Therefore, a person (e.g. a passenger in a succeeding traveling vehicle, a passer-by, or the like) who sees the rear lamp unit 2 from the vehicle rear side is able to visually recognize the rear lamp unit 2 from any side i.e. from the upper portion 141u on the upper side than the outer portion 32 or from the lower portion 141d on the lower side than the outer portion 32. Thus, it is possible to secure visibility of the rear lamp unit 2.

Therefore, it is possible to secure visibility of the rear lamp unit 2, secure design freedom around the rear lamp unit 2, and improve external appearance, without adding an element on the side of the rear lamp unit 2 such as providing a plurality of lamp bodies by dividing the rear lamp set 6 into an upper portion and a lower portion with respect to the rear spoiler 3.

Further, in the embodiment, the rear spoiler 3 extends in the vehicle front-rear direction (see FIG. 4, FIG. 6, and FIG. 8), and a portion of the rear lamp unit 2 located on the lower side of the rear spoiler 3, specifically, the lower portion 141d of the lens surface 141 of the rear lamp set 6 on the lower side than the outer portion 32 may overlap the rear spoiler 3 in a plan view depending on an angle of elevation of the lens surface 141. However, the lower portion 141d can be directly and visually recognized when viewed from the rear side of the vehicle 1 (see FIG. 2 and FIG. 8).

According to the aforementioned configuration, although the rear spoiler 3 extends in the front-rear direction in order to improve aerodynamic performance and external appearance, a person is able to directly and visually recognize, from the rear side of the vehicle 1, the lower portion 141d of the lens surface 141 of the rear spoiler 3 of the rear lamp unit 2 located on the lower side than the outer portion 32. Therefore, it is possible to secure visibility of the rear lamp unit 2.

Further, in the embodiment, the rear spoiler 3 is disposed at such a position that the height Hd of a lower portion of the rear lamp unit 2 on the lower side than the rear spoiler 3 is larger than the height Hu of an upper portion of the rear lamp unit 2 on the upper side than the rear spoiler 3 in the up-down direction when viewed from the rear side of the vehicle 1 (see FIG. 2).

According to the aforementioned configuration, in a configuration in which the rear lamp unit 2 is divided into two parts in the up-down direction by the outer portion 32 of the rear spoiler 3, it is possible to prevent that the lower portion 141d of the rear lamp unit 2 with respect to the outer portion 32 is difficult to be visually recognized by a third person on the vehicle rear side, as compared with the upper portion 141u by disposing the rear spoiler 3 at such a position that the height Hd of a lower portion of the rear lamp set 6 on the lower side than the rear spoiler 3 is larger than the height Hu of an upper portion of the rear lamp set 6 on the upper side than the rear spoiler 3 in the up-down direction when viewed from the rear side, as described above. This makes it possible to improve visibility of the lower portion 141d when viewed obliquely from above a vehicle and from the rear side of a vehicle, or from above a vehicle (e.g. from a passenger in a succeeding truck, bus, or minivan, whose line of sight is high, a passenger on a two-wheeled vehicle, or a passer-by), while improving aerodynamic performance and external appearance.

Regarding correspondence between a configuration of the present disclosure, and a configuration of the embodiment, a lamp in the present disclosure corresponds to the rear lamp unit 2 in the embodiment. Likewise, a dividing member corresponds to the rear spoiler 3 or a rear spoiler 3A to be described later. A lamp set corresponds to the rear lamp set 6. A portion of a lamp located on the lower side of the dividing member corresponds to the lower portion 141d of the lens surface 141. A height of an upper portion of a lamp on the upper side than the dividing member in the up-down direction corresponds to the height Hu of an upper portion of the rear lamp set on the upper side than the rear spoiler in the up-down direction. A height of a lower portion of a lamp on the lower side than the dividing member in the up-down direction corresponds to the height Hd of a lower portion of the rear lamp set on the lower side than the rear spoiler in the up-down direction. The technical range of the present disclosure, however, is not limited by the aforementioned configuration of the embodiment. For example, it is possible to apply the following modifications.

[Modification]

Figure 11:
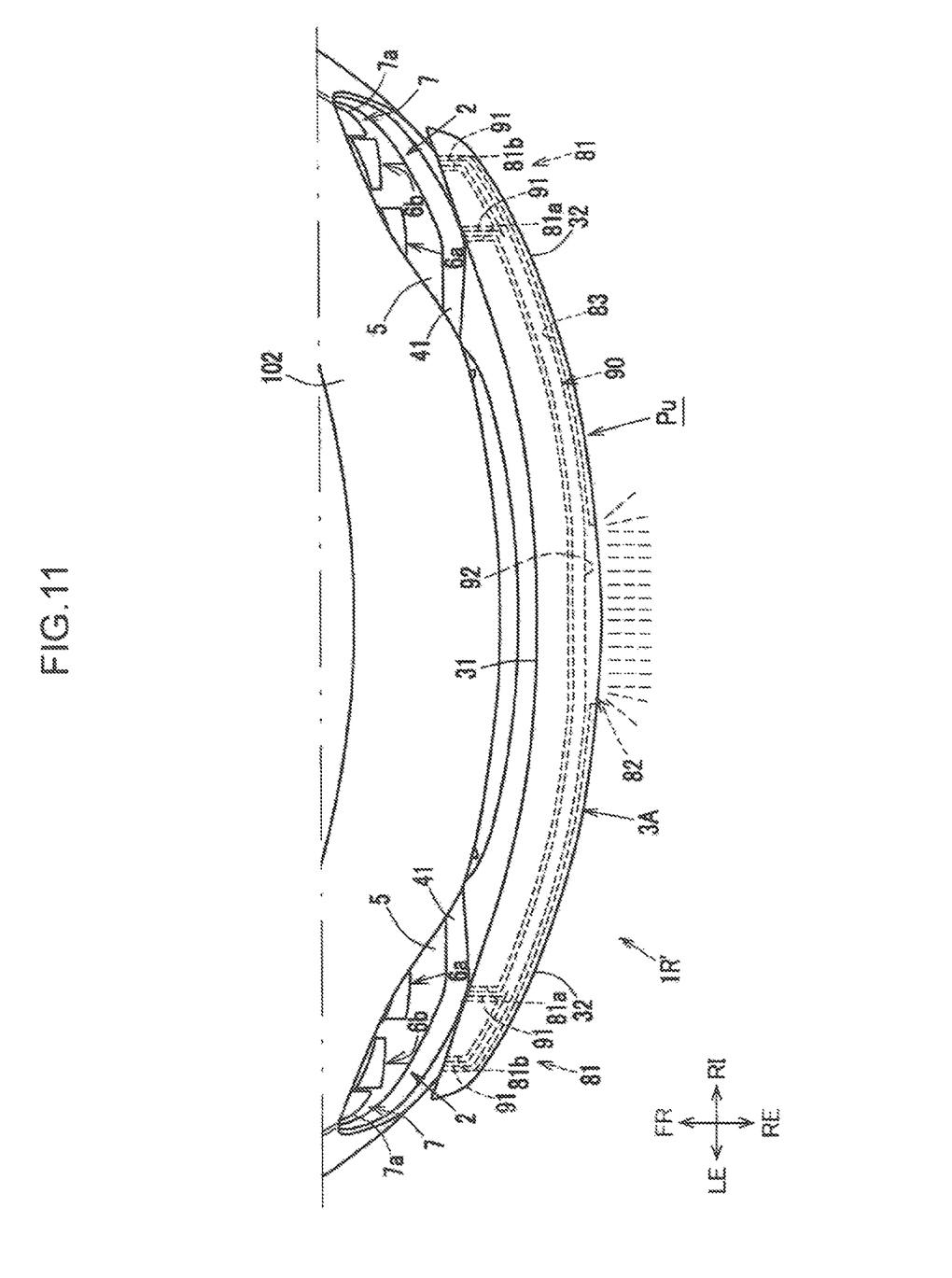
FIG. 11 is a schematic plan view illustrating a structure of a vehicle rear portion 1R according to a modification.

A structure of the rear spoiler 3A in the modification is described using FIG. 11. FIG. 11 is a plan view illustrating a structure of a vehicle body rear portion provided with the rear spoiler 3A in the modification.

As illustrated in FIG. 11, the rear spoiler 3A in the modification includes an optical fiber 90 for guiding light emitted from an LED light source 12 provided in a rear lamp set 6.

Specifically, an incident space 81 for allowing incidence of light emitted from the LED light source 12 toward the rear spoiler 3A, an exit space 82 for outputting light from the rear spoiler 3A, and an inner path 83 for communicating the incident space 81 and the exit space 82 and capable of accommodating the optical fiber 90 between the incident space 81 and the exit space 82 are provided in the rear spoiler 3A.

The optical fiber 90 as a light guiding portion is accommodated in the inner path 83. The optical fiber 90 is wired in the incident space 81 and the exit space 82.

The incident space 81 is formed in an inner left portion and in an inner right portion of a front end of the rear spoiler 3A to open toward the front side. The incident space 81 includes an inner incident space 81a formed on the rear side of an inner rear lamp set 6a, and an outer incident space 81b formed on the rear side of an outer rear lamp set.

Further, an incident end portion 91 of the optical fiber 90 is disposed in the incident space 81 (81a and 81b) in such a manner that light emitted from the LED light source 12 of the rear lamp set 6 associated with each of the inner incident space 81a and the outer incident space 81b is allowed to be incident on the rear spoiler 3A.

Further, the exit space 82 is formed in a rear portion of the middle of the rear spoiler 3A in the vehicle width direction to open toward the rear side. An exit end portion 92 of the optical fiber 90 is disposed in the exit space 82 in such a manner that light is output from the exit space 82 toward the vehicle rear side.

The exit end portion 92 of the optical fiber 90 is a portion for refracting light laterally (toward the rear side). For example, a refracting portion (not illustrated) such as a plurality of ring-shaped members are disposed at a certain interval.

The inner path 83 is formed in such a manner that the incident space 81a and the exit space 81b are joined in the middle from the incident space 81 to the exit space 82.

The optical fiber 90 is accommodated in the inner path 83. Two branched incident ends of the optical fiber 90 are disposed in the incident space 81 (respectively, in the outer incident space 81b and the inner incident space 81a). An exit end of the optical fiber 90 is disposed in the exit space 82 (see FIG. 11).

An outer portion 32 of the rear spoiler 3A is formed at a position where at least light from a rear lamp unit 2 is blocked or radiated when the rear spoiler 3A is in any posture i.e. in a down posture Pd or in an up posture Pu, as well as the rear spoiler 3 in the embodiment. Therefore, in a vehicle according to the modification, it is possible to complement light whose intensity is decreased by the rear spoiler 3A with light to be output from the exit end portion 92 of the rear spoiler 3A.

Specifically, as illustrated in FIG. 11, when the rear spoiler 3A is in an up posture Pu, light from the rear lamp unit 2 is incident on the rear spoiler 3A, and the light is guided to a rear end of a middle portion 31 of the rear spoiler 3A, and is output from a rear end of the middle portion 31. Thus, the rear lamp unit 2 is used as a high mount stop lamp.

In addition to the above, it is not necessary to configure the rear spoiler 3A in such a manner that the rear spoiler 3A includes a light emitting member or a lamp unit. This is advantageous in reducing the weight, saving energy, and reducing the parts cost.

In the modification, the rear spoiler 3A is configured such that light output both from the inner rear lamp set 6a and the outer rear lamp set 6b is guided to the exit space 82. Alternatively, it is possible to configure such that light emitted from one of the inner rear lamp set 6a and the outer rear lamp set 6b is incident from the incident space 81 and is guided to the exit space 82.

Further, it is possible to configure such that light emitted from the inner rear lamp set 6a and light emitted from the outer rear lamp set 6b are individually output so that a rear spoiler is complemented with a plurality of lamps (e.g. functions of a high mount stop lamp, and an accessory lamp for use when a vehicle travels backward).

A light guiding portion is not limited to the optical fiber 90, as far as the light guiding portion is a member capable of guiding light incident from the incident space 81 to the exit space 82, such as disposing a light transmissive member made of resin, glass, or the like.

Further, the exit space 82 is formed in a rear portion of the middle of the rear spoiler 3A in the vehicle width direction in such a manner that light is output toward the rear side. Alternatively, it is possible to form the exit space 82 in one, or two or more other portions of a rear spoiler 3 in such a manner that light is output in another direction.

[Other Modifications]

The rear lamp units 2 in the embodiment and in the modification are not limited to a configuration, in which the two rear lamp bodies 6 and the turn signal portion 7 are disposed side by side in the recess portion 4, which is formed in the vehicle rear portion 1R to project toward the vehicle front side. For example, rear lamp bodies 6 of the number other than two may be provided. Alternatively, a rear lamp unit 2 may include a transparent cover or a lens in such a manner that an opening of a recess portion 4 is closed, and the transparent cover or the lens forms a part of a vehicle body surface.

Further, in the embodiment and in the modification, the posture of the rear spoiler 3, 3A is changeable between a down posture Pd and an up posture Pu depending on whether the vehicle 1 is stopped or is traveling. Alternatively, it is possible to configure a rear spoiler in such a manner that the posture of the rear spoiler is changed based on a state of a vehicle incorporated with the rear spoiler, for example, the posture is automatically changed from a down posture Pd to an up posture Pu by detecting that a traveling speed of the vehicle is equal to or larger than a predetermined speed.

Further, it is possible to configure such that a state in the vicinity of a vehicle incorporated with a rear spoiler, such as a succeeding vehicle or a passer-by, is detected/received from an infrastructure system, and the posture of the rear spoiler is changed based on a detection result (e.g. in a case where it is judged to be necessary to notify a state of the vehicle to a passenger in a succeeding vehicle or to a passer-by, the posture of the rear spoiler 3, 3A is automatically changed from a down posture Pd to an up posture Pu).

Further, in the embodiment and in the modification, a driver may preferentially change the posture of the rear spoiler between a down posture Pd and an up posture Pu. In this case, it is possible to configure such that the posture of the rear spoiler is arbitrarily changed when a driver operates a control switch provided in a vehicle compartment, or operates a switch provided on an instrument panel, a center console, or the like. Alternatively, it is possible to configure such that the posture of the rear spoiler is manually changed before the vehicle travels according to a preference of a passenger, without providing drive means. The configuration of changing the posture is not specifically limited.

[Aspects of Present Disclosure]

A rear structure of a vehicle according to an aspect of the present disclosure includes a lamp and a dividing member.

The lamp includes at least one lamp set, and is disposed on a rear portion of the vehicle.

The dividing member is a member for dividing the lamp at least in a vehicle up-down direction.

In the rear structure of the vehicle according to the aspect, the dividing member is formed in such a manner that blinking of a single lamp set of the lamp is directly viewable both from above and below the dividing member when viewed from a rear side of the vehicle.

According to the aspect, it is possible to secure visibility of the lamp, secure design freedom around the lamp such as a tail lamp, and improve external appearance, without adding an element on the side of the lamp such as providing a plurality of lamp bodies.

A rear structure of a vehicle according to another aspect of the present disclosure is such that in the aforementioned configuration, the dividing member extends in a vehicle front-rear direction, and a portion of the lamp located on a lower side of the dividing member overlaps the dividing member in a plan view, and is directly viewable when viewed from the rear side.

According to the aspect, it is possible to secure visibility of the lamp, even if the dividing member extends in the vehicle front-rear direction so as to secure aerodynamic performance and to improve external appearance.

A rear structure of a vehicle according to another aspect of the present disclosure is such that in the aforementioned configuration, the dividing member is disposed at such a position that a height of a lower portion of the lamp on a lower side than the dividing member is larger than a height of an upper portion of the lamp on an upper side than the dividing member in the vehicle up-down direction when viewed from the rear side of the vehicle.

According to the aspect, it is possible to improve visibility of the lamp when viewed obliquely from above the vehicle and from the rear side of the vehicle, or from above the vehicle, while improving aerodynamic performance and external appearance.

A rear structure of a vehicle according to another aspect of the present disclosure is such that in the aforementioned configuration, the dividing member includes a light guiding portion for guiding light in such a manner that the lamp set being at least a part of the lamp blinks.

According to the aforementioned configuration, it is possible to complement light whose intensity is decreased by the dividing member with light from the light guiding portion of the dividing member.

The invention claimed is:

1. A rear structure of a vehicle, comprising:
    a lamp including a plurality of lamp sets each having a lamp case, and disposed on a rear portion of the vehicle; and
    a dividing member having a plate shape and disposed behind the lamp on a rear side of the vehicle, wherein
    the dividing member has a thickness in a vehicle up-down direction and an edge at a distance from the lamp in a posture extending rearward from the edge,
    the dividing member in the posture dividing a rear portion of at least one lamp set among the plurality of lamp sets in the vehicle up-down direction when viewed from the rear side of the vehicle.

2. The rear structure of the vehicle according to claim 1, wherein
    the lamp set divided by the dividing member in the vehicle up-down direction has an intermediate area above which the dividing member transverses in a vehicle width direction, and an area located on a lower side of the intermediate area, overlapping the dividing member in a plan view, and being directly viewable when viewed from the rear side.

3. The rear structure of the vehicle according to claim 1, wherein
    the lamp set divided by the dividing member in the vehicle up-down direction has an intermediate area above which the dividing member transverses in a vehicle width direction, a lower area located on a lower side of the intermediate area, and an upper area located on an upper side of the intermediate area, the lower area being higher than the upper area in the vehicle up-down direction when viewed from the rear side of the vehicle.

4. The rear structure of the vehicle according to claim 1, wherein
    the dividing member includes:
        an incident space which allows light emitted from the lamp set divided by the dividing member in the vehicle up-down direction to be incident therein, the incident space having an opening extending rearward from a portion of the dividing member facing the divided lamp set
        an exit space which allows the light having been incident to be output therefrom rearward, the exit space having an opening extending frontward from a middle rear portion of the dividing member in a vehicle width direction; and
        a light guiding portion which guides the light having been incident in the incident space to the exit space.

5. The rear structure of the vehicle according to claim 1, wherein
    the plurality of lamp sets are disposed side by side in a vehicle width direction, and
    the dividing member transverses an intermediate area of each of the plurality of lamp sets in the vehicle up-down direction to divide a rear portion of each of the plurality of lamp sets in the vehicle up-down direction when viewed from the rear side of the vehicle.

6. The rear structure of the vehicle according to claim 1, wherein
    the rear portion of the vehicle is formed with a recess portion depressed frontward,
    the lamp is accommodated in the recess portion, and
    the recess portion accommodating the lamp has an internal space communicating with an outside of the vehicle.

7. The rear structure of the vehicle according to claim 5, wherein
    the rear portion of the vehicle is formed with a recess portion depressed frontward,
    the lamp is accommodated in the recess portion, and
    the recess portion accommodating the lamp has an internal space communicating with an outside of the vehicle.

* * * * *